Figure 1:
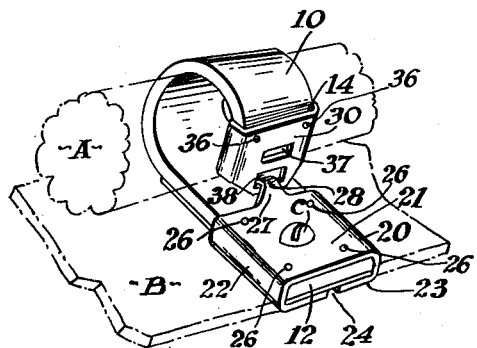

May 22, 1951     G. A. TINNERMAN     2,553,883

FASTENING DEVICE

Original Filed June 19, 1944

INVENTOR.

George A. Tinnerman

BY Bates, Teare & McBean,

Attorneys

Patented May 22, 1951

2,553,883

UNITED STATES PATENT OFFICE 2,553,883

FASTENING DEVICE

George A. Tinnerman, Cleveland, Ohio, assignor to Tinnerman Products, Inc., Cleveland, Ohio, a corporation of Ohio Original application June 19, 1944, Serial No. 540,913. Divided and this application March 11, 1946, Serial No. 653,599

5 Claims. (Cl. 248—74)

This application is a division of my copending application Ser. No. 540,913, filed June 19, 1944, for Fastening Device, now Patent No. 2,464,620, issued March 15, 1949.

This invention relates to a fastening device comprising a flexible strap or loop and a pair of members adapted to be mounted respectively on the end portions of the loop and coact with each other by snap action to lock the loop closed. One of the objects of the invention is to provide the coacting members of such form that they be effectively attached to the strap and will readily coact with each other by snap action when it is desired to close the strap, and will allow separation by a suitable force, whenever desired.

Another object of the invention is to provide fastening means for the loop effective to hold the loop in different closed positions so that it may snugly embrace bundles of somewhat different contours. Still another object is to form the device with provision for ready and effective mounting on a support by an attaching screw.

A preferred embodiment of my invention is illustrated in the drawings hereof and hereinafter described and the essential novel features are set out in the claims.

Figure 2:
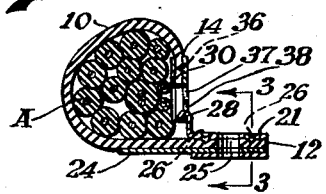
Figure 3:
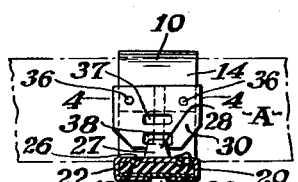
Figure 4:
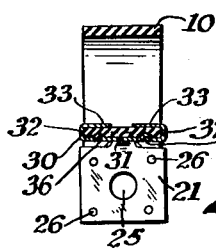

In the drawings, Fig. 1 is a perspective of my fastening device in a position it occupies when attached to a support and embracing an article or group of articles to be held; the support and articles being indicated by broken lines; Fig. 2 is a longitudinal section of the fastening device; Fig. 3 is a vertical section on the line 3—3 in Fig. 2; Fig. 4 is a horizontal section on the line 4—4 of Fig. 3.

As shown in Figs. 1 and 2, my fastening device is very suitable for embracing and holding a bundle of insulated wires illustrated at A. As hereinafter explained in detail, the device may clamp such bundle tightly, even though its external contour varies somewhat. This enables a tight harness of the wires so that their number may be varied in repairing or for making an additional installation.

The loop 10, shown in each of the views, has one substantially tangential end portion 12 and another end portion as 14, projecting directly, at substantially a right angle, toward an intermediate region of the portion 12. The tangential arm of the loop carries one member 20 of the fastening device which coacts variously with the other member 30 secured to the end portion 14. The fastening is adapted to be attached to the support, by a screw as shown at C in Fig. 1, passing through the member 20 and into the support B.

As shown, the fastening member 20 has a top portion 21, return-bend edges 22 and bottom portions 23, so that it may embrace the strap arm 12. I preferably reinforce that arm on its underside by a plate 24. Suitable registering bolt openings are provided through the top layer 21; the arm 12; the reinforcing plate, and the bottom portion by central enlargement of the bottom space, all as indicated by the general character 25 in Fig. 2. Suitable indentations 26 in the top plate 21 firmly lock this fastening member to the flexible loop. A tongue 27 is formed at the inner edge of the top plate 21 and extends upwardly therefrom and is then bent downwardly into a hook 28, Fig. 2, to coact with the other member 30, as about to be described.

The member 30 has an intermediate portion 31, return-bend edges 32 and final portions 33, so that the device may readily embrace the end portion 14 of the strap and be effectively locked in this position by indentations 36. The member 30 is provided with a plurality of openings 37, 38 which may be occupied by the hooked end 28 of the tongue 27.

Figs. 2 and 3 show the hook 28 engaging the opening 38 in the clip 30 and as thus binding a loop of wires A within the loop. To open the loop and free the wires it is merely necessary to press the member 30 downwardly and inwardly toward the loop arm 12 to free the member from the hook. To make a more constricted embrace of the articles to be held, the member 30 is pressed further inwardly until the hook 28 engages the upper opening 37 of the fastening. I have shown merely two openings, which are to be taken as an indication of any convenient number of more than one.

With such a construction, the device may be fixedly mounted on a suitable support and is then ready for the reception of what ever is to be held, as, for instance, a bundle of wires, and then may be snapped tight shut. If it is necessary to remove a wire for repairs (as frequently happens in airplane work) the release of the member 30 from the hook immediately opens the loop and after the injured wire is repaired, or a substitute supplied, the device may be readily snapped shut. In the original installation, or following the repairs, the latitude allowed by the multiple anchorages for the fastening hook provides for the ready embracing of the wires with the snugness desired.

I claim:

1. In a fastening device, the combination of a loop of flexible material having projecting end arms, a pair of fastening members each embracing a projecting arm of the loop, there being registering openings through one of the fastening members and through the embraced arm of the loop to provide for the passage of a fastening screw, one of the arms having a projection adapted to overlap the other member, one of said overlapping portions having an opening and the other overlapping portion having a hook adapted to enter said opening.

2. The combination of a flexible loop having separate end arms, a fastening device embracing one end arm and provided with an opening for the passage of attaching screw, said fastening device having a tongue projecting away from the arm and formed with a hooked end, a member embracing the other end arm of the loop and projecting toward the arm carrying the first-mentioned fastener said second embracing member having a plurality of openings, any of which may be occupied by said hook.

3. A fastening device comprising a loop of flexible material having one substantially tangential end portion and another end portion projecting toward an intermediate region of the first mentioned portion, a fastening member embracing and secured to the first mentioned end portion on the outer side of said intermediate region, a fastening member embracing and secured to the second mentioned end portion, one of said fastening members being provided with an opening and the other with a hook adapted to occupy the opening.

4. A fastening device comprising a loop of flexible material having one substantially tangential end portion and another end portion projecting toward an intermediate region of the first-mentioned portion, a fastening member embracing the tangential portion of the loop beyond said intermediate region thereof whereby said portion may be secured to a support, said member having at its inner end a projection terminating in a hook, a fastener on the other end portion of the loop projecting toward said intermediate region and being provided with an opening which said hook may occupy.

5. The combination of a flexible loop adapted to embrace an object to be held and having end arms, two fastening members secured to said end arms respectively, one of said fastening members extending in the same direction as the loop arm to which it is attached and the other fastening member having a portion projecting at substantially a right angle to the loop arm to which it is attached, said portion coacting with the other fastening member and one of such coacting parts having a hook and the other a plurality of openings, any one of which may be occupied by said hook.

GEORGE A. TINNERMAN.

REFERENCES CITED

The following references are of record in the file of this patent:

UNITED STATES PATENTS

| Number | Name | Date |
| --- | --- | --- |
| 2,059,825 | Talbott | Nov. 3, 1936 |
| 2,340,713 | Tinnerman | Feb. 1, 1944 |
| 2,373,328 | Morehouse | Apr. 10, 1945 |
| 2,409,772 | Lund | Oct. 22, 1946 |